United States Patent [19]

Iwaya

[11] Patent Number: 4,917,212
[45] Date of Patent: Apr. 17, 1990

[54] SPEAKER SUPPORTING UNIT
[75] Inventor: Yutaka Iwaya, Kodaira, Japan
[73] Assignee: Nakamichi Co., Ltd., Tokyo, Japan
[21] Appl. No.: 284,898
[22] Filed: Dec. 15, 1988
[30] Foreign Application Priority Data Dec. 15, 1987 [JP] Japan .................... 62-190452[U]

[51] Int. Cl.$^4$ .............................................. H05K 5/00
[52] U.S. Cl. .................................. 181/141; 181/150;
181/154; 181/171; 381/188; 381/205
[58] Field of Search ............... 181/141, 148, 150, 154,
181/171; 381/187, 188, 205

[56] References Cited
U.S. PATENT DOCUMENTS 4,292,679 9/1981 Kondo et al. ................... 181/171 X
4,630,303 12/1986 Tanno ............................ 381/188 X Primary Examiner—B. R. Fuller
Attorney, Agent, or Firm—Gifford, Groh, Sheridan, Sprinkle and Dolgorukov

[57] ABSTRACT

A speaker is installed on a door panel of an automobile by utilizing a supporting unit including a base and a substantially disc-shaped spacer. The base is attached to the door panel and has a bottom surface inclined with respect to the door panel. The speaker is secured to the inclined bottom surface of the base by an attachment screw, between which the spacer is interposed. The spacer has an inclined surface adapted to be in contact with the inclined bottom surface of the base. The spacer is provided with a half-round groove through which a screw extends to secure the spacer to the base at a desired position relative to the latter within an range of 180° rotation. The inclination of the base is amplified or counterbalanced by the inclination of the spacer in dependence with relative position therebetween to vary the orientation of the speaker supported on the opposite surface of the spacer.

7 Claims, 8 Drawing Sheets

SPEAKER SUPPORTING UNIT

BACKGROUND OF THE INVENTION

This invention relates to a speaker supporting unit which is most adapted to attach a speaker unit to a door panel of an automobile.

In an audio system installed in an automobile, a speaker unit is often attached to a door panel of the automobile. One of the prior art technique for mounting the speaker unit is shown in FIG. 12 and FIG. 13 which employs a pair of dish-shaped mounting bases 62 and 64. The interior mounting base 62 is inserted through a circular opening 60a formed in the door panel 60 to be engaged within the other mounting base 64. These mounting bases 62 and 64 are then joined together by fastening screws 65, 65. The mounting base assembly is thus secured to the door panel 60 by rims thereof tightened across the door panel 60. There are interposed between the mounting bases 62 and 64 a predetermined number of washers 66 corresponding to the thickness of the door panel 60, to prevent deformation of the mounting bases when tightened. A speaker 70 to which a grille lid 68 is attached is contained in the mounting base 62 and secured by any suitable fastening means (not shown). In this prior art, a spacer 72 may be additionally employed in a manner as particularly shown in FIG. 13 to change and adjust the orientation of the speaker 70, in which case the screw 74 should be accompanied by a bracket 76 to thereby extend in a direction perpendicular to the inclined orientation of the speaker 70.

According to the foregoing prior art, however, the orientation of the speaker 70 will be determined in dependence upon the inclination of the spacer 72. It has been impossible to adjust as desired the orientation of the speaker within a wide adjustable range. One or more sets of the spacer and the corresponding bracket should be prepared and selectively used upon necessity, which not only is troublesome but also may cause accidental loss of the adjustment members. Further, as the inner diameter of the mount base should be large enough to allow the orientation of the speaker to be changed, there might be a great probability of foreign matter entering into the mount base.

BRIEF SUMMARY OF THE INVENTION

It is therefore an object of the invention to provide a novel speaker system particularly installed in an automobile according to which a speaker can be oriented toward any desired orientation.

Another object of the invention is to provide means for adjusting orientation of the speaker which is simple in construction and operation.

In accordance with an aspect of the invention there is provided a speaker supporting unit comprising a base attached to an installation surface said base having an inclined reference surface relative to the installation surface; means for securing a speaker to the base; a spacer interposed between the speaker and the base and having a first surface adapted to be in contact with speaker and a second surface opposite to the first surface and inclined relative thereto and adapted to be in contact with the inclined surface of the base; and means for relatively rotating the base and the spacer. The orientation of the first surface of the spacer, which is a determinant of the orientation of the speaker, is determined by a combination of the inclination angles of the two contact surfaces, that is the inclined surface of the base and the second surface of the spacer, which is varied by the relative angular position between the base and the spacer.

According to another aspect of the invention there is provided a speaker supporting unit comprising a base having a reference surface extending in parallel to an installation surface to which a speaker is to be mounted; a first spacer secured to the base at a desired rotational position relative thereto and having a first surface adapted to be in contact with the reference surface of the base and a second surface opposite to the first surface and inclined relative thereto; a second spacer secured to a speaker at a desired rotational position relative thereto and having a first surface adapted to be in contact with the speaker and a second surface opposite to the first surface and inclined relative thereto and adapted to be in contact with the second surface of the first spacer; and means for joining together said base to which said first spacer has been attached and the speaker to which the second spacer has been attached, at a desired relative rotational position therebetween.

BRIEF DESCRIPTION OF THE DRAWINGS

Further objects and advantages of the invention can be fully understood from the following description when read in conjunction with the accompanying drawings in which.

DESCRIPTION OF THE PREFERRED EMBODIMENTS

Figure 1:
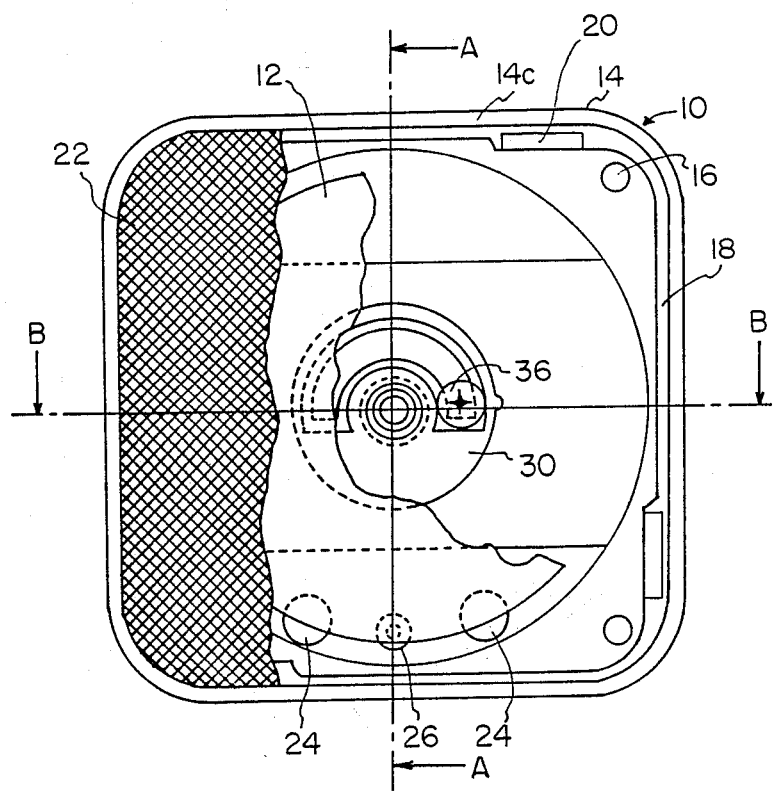
FIG. 1 is a top plan view, partially broken away, showing a speaker supporting unit embodying the invention together with a speaker assembled in the unit.
Figure 2:
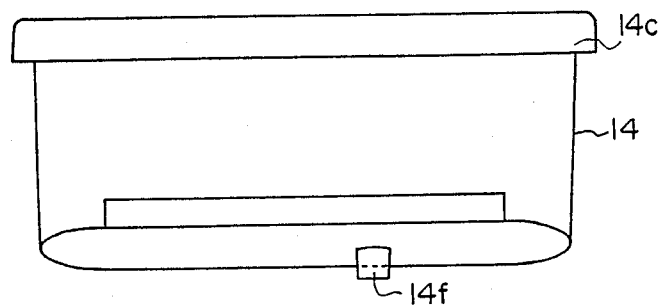
FIG. 2 is a side view of the unit.
Figure 3:
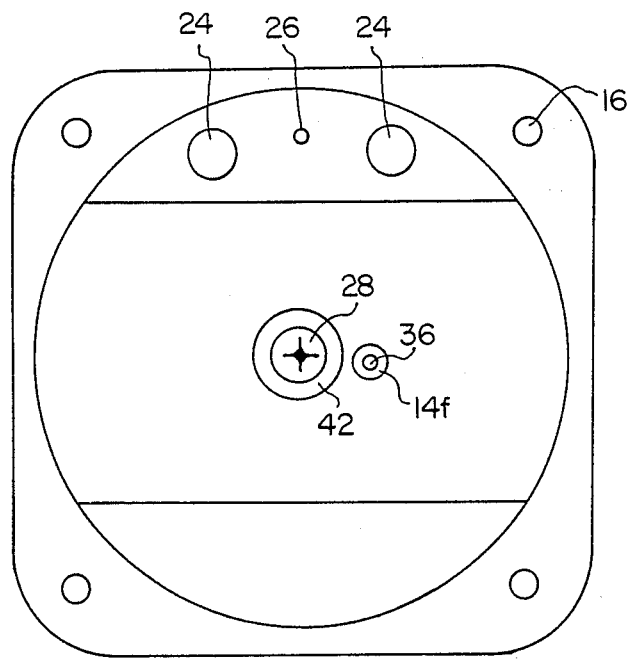
FIG. 3 is a bottom view of the unit.
Figure 4:
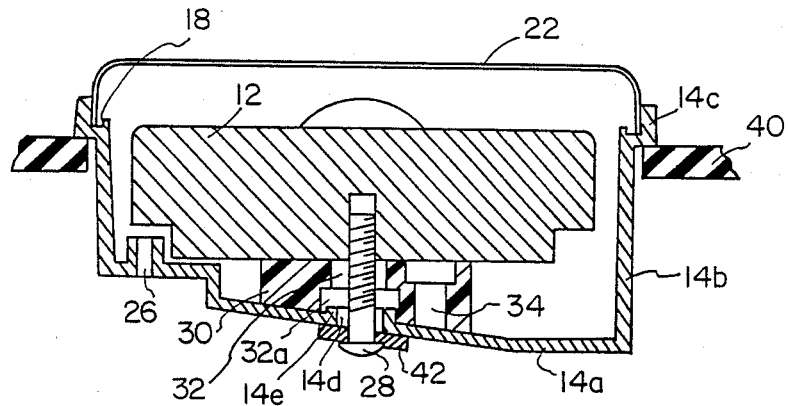
FIG. 4 is a sectional view taken along the line A-A in FIG. 1.

Reference should be made to FIG. 1 through FIG. 9 in which a first embodiment of the invention is shown. A speaker supporting fixture 10 according to the first embodiment has a mounting base 14 which declines an inner cylindrical hollow space for accommodating a speaker unit 12 of relatively small diameter such as a tweeter. As particularly seen in FIG. 4, the mounting base 14 is integrally formed by a circular base 14a inclined in one direction to form an inclined reference surface, a wall 14b extending upwardly from the circumferential edge of the base 14a for defining therein the speaker accommodating space and a flange 14c extending outwardly from the upper end portion of the wall 14b. The mounting base 14 is secured to a door panel of an automobile, for example, by fastening means (not shown) extending through holes 16 (FIG. 1) formed in respective four corners of the flange 14c. The flange 14c includes a round groove 18 into which is press-fit the lower end of a grille lid 22, thereby covering the opening of the mount base 14 for preventing entry of foreign matter. Anti-skid members 20 of resilient material such as butyl rubber are bonded to the bottom of the groove 18 at suitable intervals to prevent accidental removal of the grille lid 22 out of the mount base 14. Speaker cords (not shown) can be led through apertures 24 formed in the bottom 14a of the mounting base 14 and therefore connected to terminals provided on the bottom of the speaker 12. The bottom 14a is also formed with a through aperture 26 to which speaker terminals (not shown) can be fastened by means of a screwdriver, for example.

The speaker 12 is attached to the mounting base 14 by securing means such as an attachment screw 28 equipped with a rubber washer 42. More particularly, the shaft portion of the attachment screw 28 is inserted from the bottom into the mounting base 14 to pass through a center opening 14d of the base 14a and through a spacer 30 which will construct a material feature of the invention, and then screwed into a threaded center hole formed in the bottom of the speaker 12.

Figure 7:
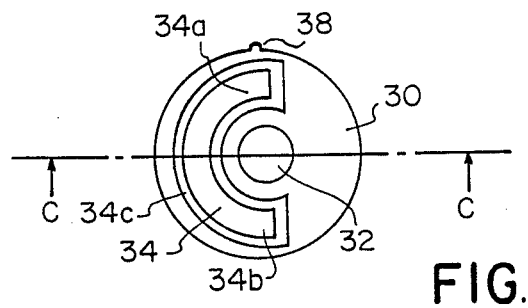
FIG. 7 is a top plan view showing a spacer employed in the unit which serves as means for adjustment of the orientation of the speaker.
Figure 8:
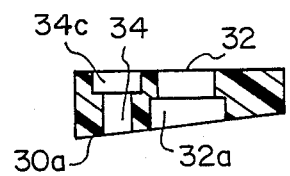
FIG. 8 is a sectional view taken along the line C-C in FIG. 7.
Figure 9:
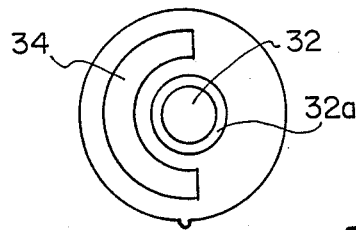
FIG. 9 is a bottom view of the spacer.

Referring specifically to FIG. 7 through FIG. 9, the spacer 30 is in general a relatively flat, disc-shaped member, and its bottom face 30a is inclined at an angle just equal to the inclination angle of the bottom 14a of the mounting base 14. The spacer 30 has a center opening 32 for allowing insertion of the attachment screw 28, and an arcuate, half-round groove 34 extending nearly 180° around the center opening 32.

The spacer 30 is secured to the mounting base 14 by means of a fastening screw 36 which is passed through the half-round groove 34 to be screwed into a threaded hole of a projection 14f formed in the bottom 14c. Because of provision of the half-round groove 34, the spacer 30 can be attached to the mounting base 14 with an allowance of nearly 180° rotation with respect thereto. More particularly, the spacer 30 is placed on the mounting base 14 in such manner that a ringed projection 14e formed around the center hole 14d of the bottom 14a will be engaged into a lower enlarged portion 32a of the center opening 32, with a certain degree of looseness. In such arrangement, the spacer 30 can be attached to the mounting base 14 at any desired relative position within a range extending nearly 180° rotation, by means of the screw 36 extending through the groove 34 to be threaded into the female screw of the bottom projection 14f. One extreme position of the spacer 30 relative to the mounting base 14 is shown in FIG. 1 through FIG. 5 and can be obtained by the screw 36 extending through one extreme end 34a of the half-round groove 34 to be fastened in the projection 14f. In this relative position, the inclination angles of the mounting base bottom 14a and the spacer bottom face 30a will be counterbalanced one another so that the speaker 12 as assembled is supported in parallel to a plane of attachment (e.g., a door panel of the automobile). The speaker 12 is mounted on the spacer 30 and secured to the mounting base 14 by the attachment screw 28, and then the grille lid 22 is attached.

To adjust orientation of the speaker 12 assembled in a position shown in FIG. 1 through FIG. 5, the grille 22 is removed to expose the speaker 12. After detaching the speaker 12 by loosening and removing the screw 28, the screw 36 is loosened to allow the spacer 30 to rotate. The ringed projection 14e protruding into the enlarged portion 32a of the center opening 32 will serve as an axis of rotation of the spacer 30. Then, the spacer 30 is rotated to a desired extent in a clockwise direction as viewed in FIG. 1 and secured to the mounting base 14 in that relative position by fastening the screw 36. The speaker 12 now having a desired orientation is secured to the mount base 14 by fastening the screw 28. Finally, the grille 22 is again attached to assemble a speaker unit.

Figure 6:
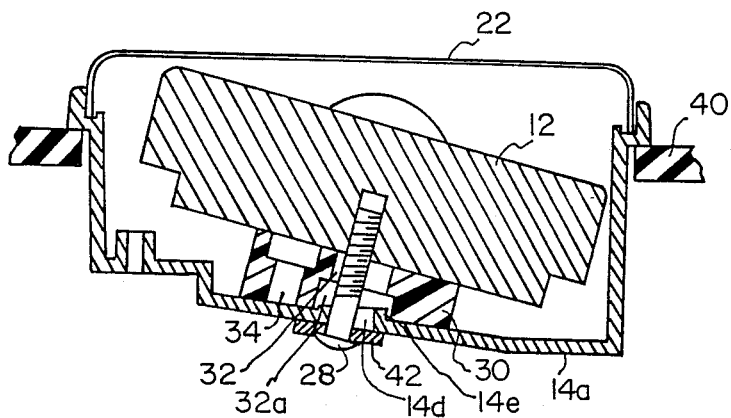
FIG. 6 is a sectional view similar to FIG. 4 but showing another position of the unit providing different orientation of the speaker.
Figure 5:
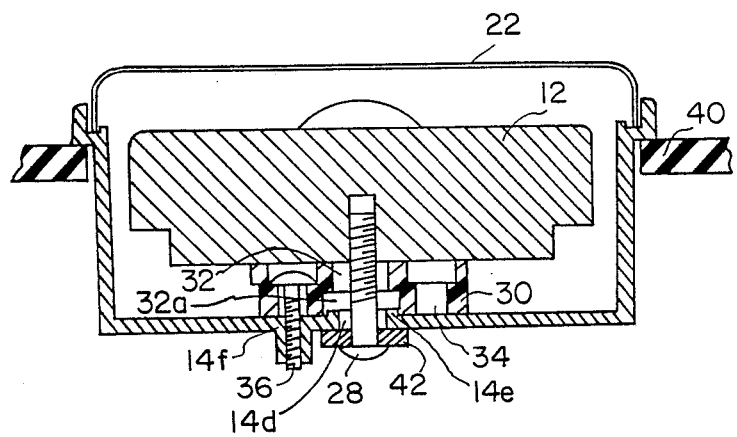
FIG. 5 is a sectional view taken along the line B-B in FIG. 1.

The other, second extreme position of the spacer 30 relative to the mounting base 14 is illustrated in FIG. 6 which is obtainable by rotating the spacer 30 by 180° in the clockwise direction (FIG. 1) from the first extreme position shown in FIG. 1 through FIG. 5. In this second extreme position, the inclination of the spacer bottom 30a is amplified by the inclination of the mounting base bottom 14a and the speaker 12 mounted on the spacer 30 is oriented in an angle of spacer inclination plus mounting base inclination. In the embodiment shown, the spacer 30 and the mounting base 14 are inclined in the same angle, 7.5°, so that the orientation of the speaker 12 assembled in position shown in FIG. 6 will be of a 15° angle with respect to the door panel 40. Thus, the speaker 12 may be adjusted to have a desired angle of orientation within a range of 0°~15° by rotating the spacer 30.

According to the first embodiment, while adjusting the orientation of the speaker 12 in a direction extending along a line A—A in FIG. 1 (this direction will be hereinunder supposed to be an up/down direction), the orientation in another direction perpendicular to the up-down direction and extending along a line B—B (this direction will be hereinunder supposed to be a horizontal direction) will also be changed depending upon the orientation in the up/down direction. In a second embodiment shown in FIG. 10 and FIG. 11, independent or separate adjustment of orientation of the speaker in the up/down direction and in the horizontal direction can be achieved. The second embodiment will now be described in detail toward arrangement and construction different from the first embodiment.

In a speaker supporting device 50 according to the second embodiment of the invention, a speaker 52 is attached to a flat bottom 58a of a mounting base 58 by means of a fastening screw 62 coupled with a rubber washer 60, with a first spacer 54 and a second spacer 56 being interposed therebetween. It should be understood that in this embodiment, the flat bottom 58a forms the reference surface which is parallel to the installation surface. The reference surface may be oriented in any direction, as long as it is parallel to the installation surface. These first and second spacers 54 and 56 are shaped and constructed similar to the spacer 30 employed in the first embodiment. The spacers 54 and 56 have inclined surfaces on one side thereof respectively, and are superposed one another with the inclined surfaces being in contact with each other. Thus, the orientation of the speaker 52 mounted on the first spacer 54 can be adjusted as desired both in the up/down direction and in the horizontal direction by rotating separately the first and second spacers 54 and 56. The speaker 52 is provided on the bottom with a ringed projection 52a which is adapted to be fitted into the center opening of the first spacer 54 and therefore will serve as a rotational axis of the first spacer 54, and the first spacer 54 is secured to the speaker 52 by a screw 64 at a desired position relative to the speaker 52 within an allowable range of 180° rotation. Similarly, a ring-like portion 58b projecting from the bottom 58a is adapted to be in engagement with the center opening of the second spacer 56 and therefore will serve as a rotational axis of the second spacer 56. The second spacer 56 is secured to the mounting base 58 by a screw 66 at a desired angular position with respect to the mounting base 58 within a range extending nearly 180°. The first spacer 54 secured to the speaker 52 and the second spacer 56 secured to the mounting base 58 can be joined together by joining means such as fastening the screw 62 extending through the center openings of the first and second spacers 54 and 56 and threaded into a female screw of the speaker 52.

Figure 10:
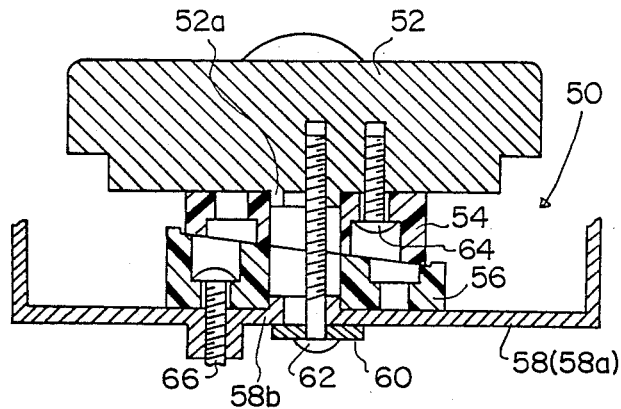
FIG. 10 is a sectional view similar to FIG. 4 but showing a speaker supporting unit according to another embodiment of the invention.

In FIG. 10, the speaker 52 is oriented perpendicular to the up/down direction and also to the horizontal direction. The inclined lower surface of the first spacer 54 and the inclined upper surface of the second spacer 56 are counterbalanced to each other, thereby supporting the speaker 52 in parallel to the mounting base bottom 58a and accordingly to the door panel.

Figure 11:
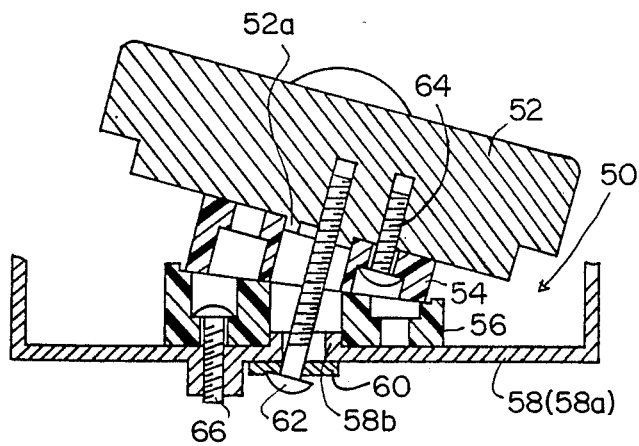
FIG. 11 is a sectional view similar to FIG. 10 but showing another position of the unit providing different orientation of the speaker.
Figure 12:
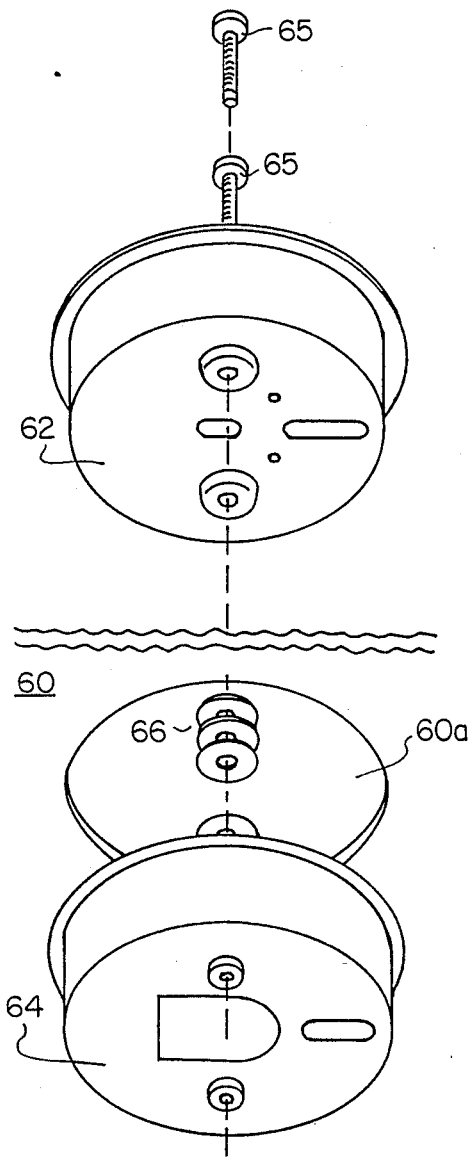
FIG. 12 and FIG. 13 are oblique views showing the prior art technique.
Figure 13:
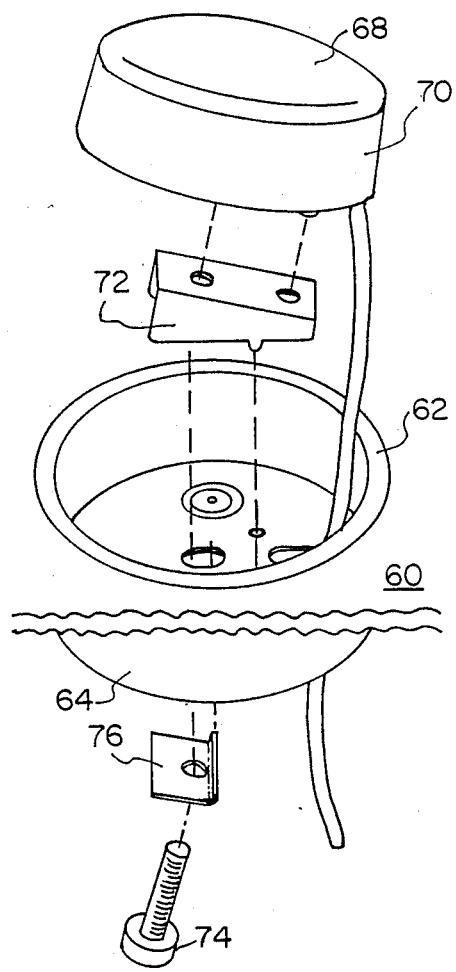

By removing the screw 62 to detach the speaker 52 along with the first spacer 54, loosening the screw 64 to rotate the spacer 54 by 180°, fastening again the screw 64 to secure the first spacer 54 to the speaker 52 and then fastening again the screw 62 to attach the speaker 52, the orientation of the speaker will be changed to that shown in FIG. 11. During such adjustment procedure, it is preferable that only the first spacer 54 is rotated to prevent substantial rotation of the speaker 52 with respect to the mounting base 54, whereby twisting of speaker cords (not shown) can be prevented and therefore the speaker cords can be shortened. In the position shown in FIG. 11, the speaker 52 provides the orientation of 15°, the sum of the inclination angles of the first and second spacers 54 and 56, each 7.5°.

According to the second embodiment, the orientation of the speaker 52 is governed by relative position between the first spacer 54 and the speaker 52, relative position between the second spacer 56 and the mounting base 58 and relative position between the first and second spacers 54 and 56. These factors can be adjusted separately and independently, thereby adjusting as desired the orientation of the speaker 52 in the horizontal direction as well as in the up/down direction. For example, where the up/down orientation of the speaker 52 shown in FIG. 10 can be changed by 7.5° up while maintaining the horizontal orientation, the adjustment procedure will comprise the steps of rotating the first spacer 54 by 90°, securing the same to the speaker 52 by the screw 64 in the middle of a half-round groove (not shown), rotating the second spacer 56 by 90°, securing the same to the mount base 58 by the screw 66 in the middle of a half-round groove (not shown) and finally fastening the screw 62 to secure the speaker 52 to the mount base 58.

Although the invention has been described in conjunction with the specific embodiments thereof illustrated herein, it is to be understood that many modifications and variations may be made without departing from spirit and scope of the invention as defined in the appended claims. For example, arrangement of the first embodiment may be modified such that the spacer 30 is secured to the speaker 12, not to the mounting base 14, and the spacer and the speaker, in a unit, are secured to the mounting base. Where a problem of arising twisting of the speaker cords in the mounting base 14 may be left out of consideration, the orientation of the speaker 12 may be adjusted by rotating the speaker 12 to which is secured the spacer 30, in which case the half-round groove 34 is not required.

What is claimed is:

1. A speaker supporting unit including a base for attachment to an installation surface, said base having an inclined reference surface relative to said installation surface;
   means for securing a speaker to said inclined reference surface:
   a spacer interposed between said speaker and said base and having a first surface adapted to be in contact with said speaker and a second surface opposite to said first surface and inclined relative thereto, and adapted to be in contact with said inclined reference surface of said base; and means for relatively rotating said base and said spacer.

2. The unit according to claim 1 wherein said rotating means comprises an arcuate opening formed in said spacer and fastening means extending through a desired position in said arcuate opening for securing said spacer to said base at a desired relative position therebetween.

3. The unit according to claim 2 wherein said arcuate opening extends substantially 180° around the center of said spacer.

4. The unit according to claim 1 wherein said inclined surface of said base and said second surface of said spacer have the same inclination angle.

5. The unit according to claim 1 wherein said base comprises a mounting base having a surface parallel to said installation surface and a member rotatably secured to said mounting base and having an inclined surface adapted to be in contact with said second surface of said spacer.

6. The unit according to claim 5 wherein said member is formed with an arcuate opening through which fastening means extend to secure said member to said mounting base.

7. A speaker supporting unit comprising a base having a reference surface extending in parallel to an installation surface to which a speaker is to be mounted; a first spacer secured to said base at a desired rotational position relative thereto and having a first surface adapted to be in contact with said reference surface of said base and a second surface opposite to said first surface and inclined relative thereto; a second spacer secured to said speaker at a desired rotational position relative thereto and having a first surface adapted to be in contact with said speaker and a second surface opposite to said first surface and inclined relative thereto and adapted to be in contact with said second surface of said first spacer; and means for joining together said base to which said first spacer has been attached to and said speaker to which said second spacer has been attached, at a desired relative rotational position therebetween.

* * * * *